United States Patent [19]

Henriksson

[11] Patent Number: 4,927,094
[45] Date of Patent: May 22, 1990

[54] OPEN-FACE FISHING REEL OF THE FIXED-SPOOL TYPE

[75] Inventor: Bengt-Åke Henriksson, Svängsta, Sweden

[73] Assignee: ABU Garcia Produktion AB, Svagsta, Sweden

[21] Appl. No.: 376,103

[22] Filed: Jul. 6, 1989

[51] Int. Cl.⁵ .............................................. A01K 89/01
[52] U.S. Cl. ....................................... 242/242; 74/50; 74/384
[58] Field of Search ................... 242/241, 242; 74/384, 74/50, 397

[56] References Cited

U.S. PATENT DOCUMENTS

| | | | |
|---|---|---|---|
| 2,301,967 | 11/1942 | Nosker | 74/50 X |
| 2,766,956 | 10/1956 | Sarah | 242/242 X |
| 4,266,739 | 5/1981 | Stiner | 242/242 |
| 4,535,953 | 8/1985 | Amori | 242/241 X |

*Primary Examiner*—Katherine A. Matecki
*Attorney, Agent, or Firm*—Browdy & Neimark

[57] ABSTRACT

An open-face fishing reel of the fixed-spool type has a housing and a spindle rotatably and axially displaceably mounted therein. A line spool is non-rotatably connected to the spindle and axially fixed to one end thereof. A drive shaft is mounted in the housing and extends at right angles to the spindle. A handle is arranged for rotating the drive shaft and a driving gear non-rotatably mounted thereon. A driver element is axially fixed on the spindle. An oscillating gear meshes with the driving gear and has an eccentric pin engaging the driver element in order, upon rotation of the drive shaft, to move the spindle back and forth in its longitudinal direction and, thus, oscillate the line spool about a center of oscillation. A shifting plate supporting a bearing pin for the oscillating gear is pivotable about the axis of the drive shaft in order to shift the bearing pin and, thus, displace the center of oscillation of the line spool to a suitable position, depending on the diameter of the fishing line used, in the longitudinal direction of the spindle.

2 Claims, 5 Drawing Sheets

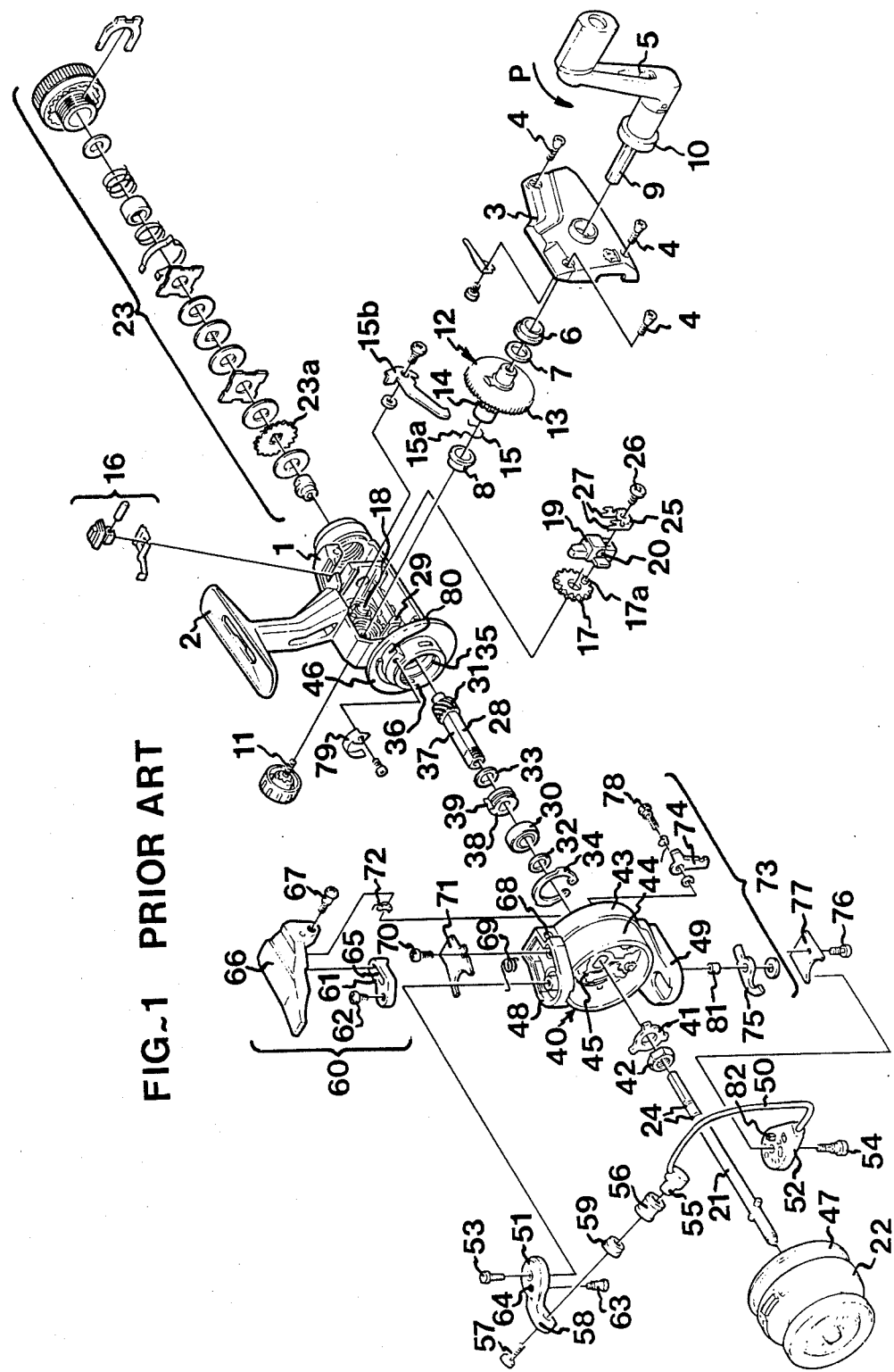
FIG_1 PRIOR ART

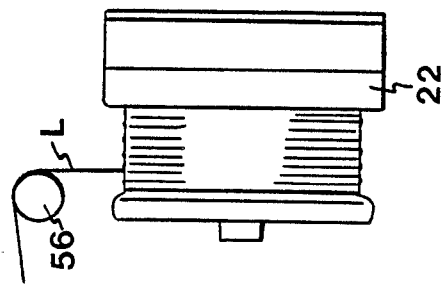
FIG.~2A
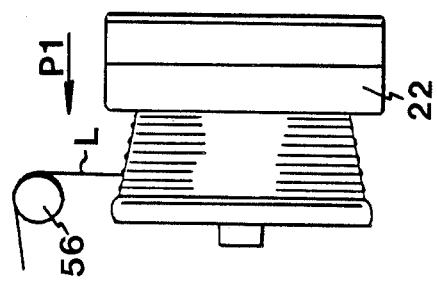
FIG.~2B
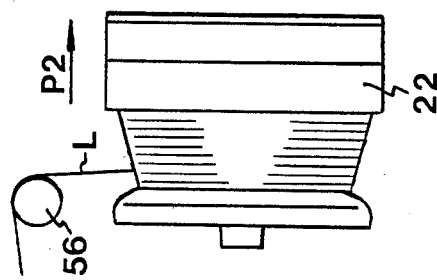
FIG.~2C

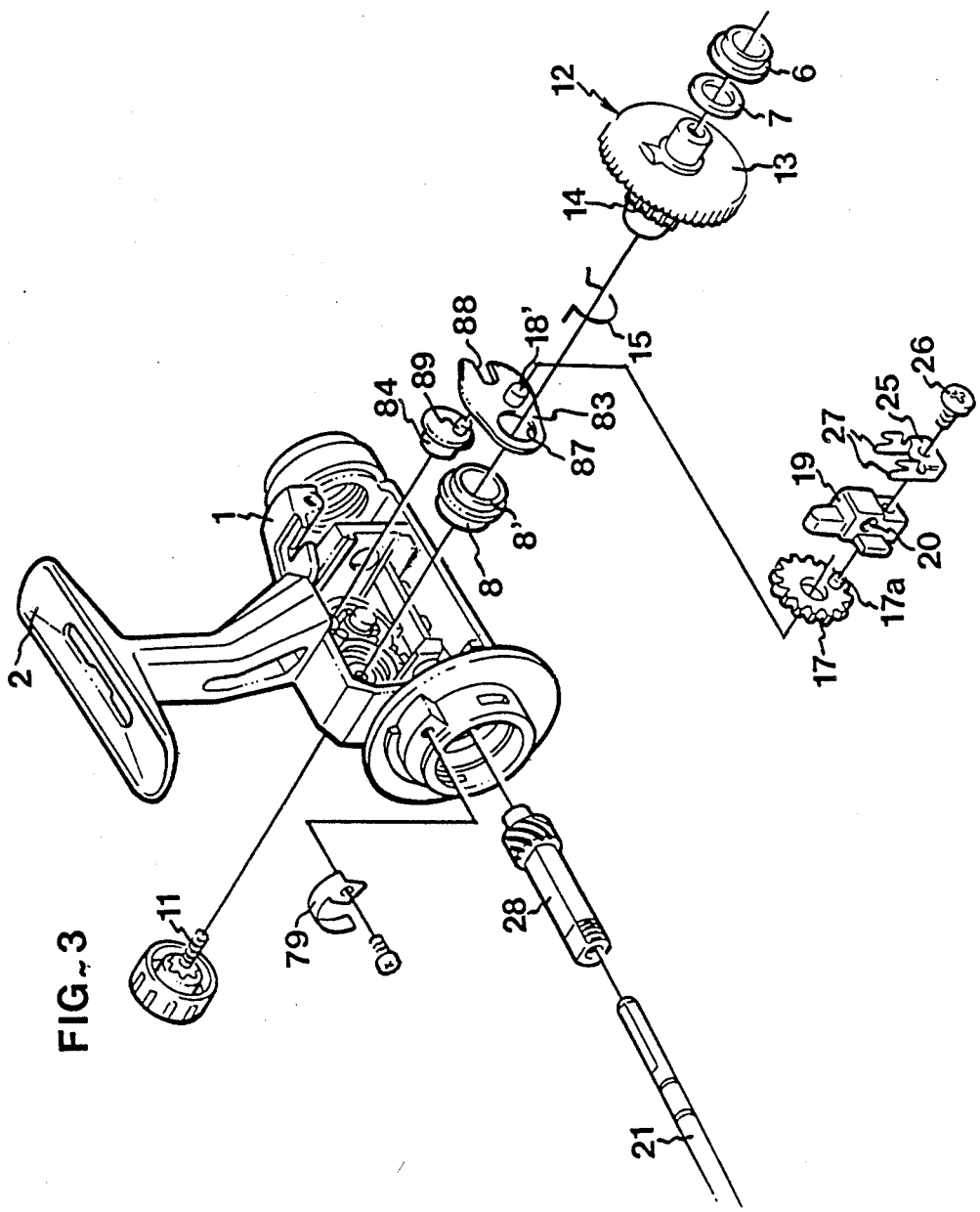

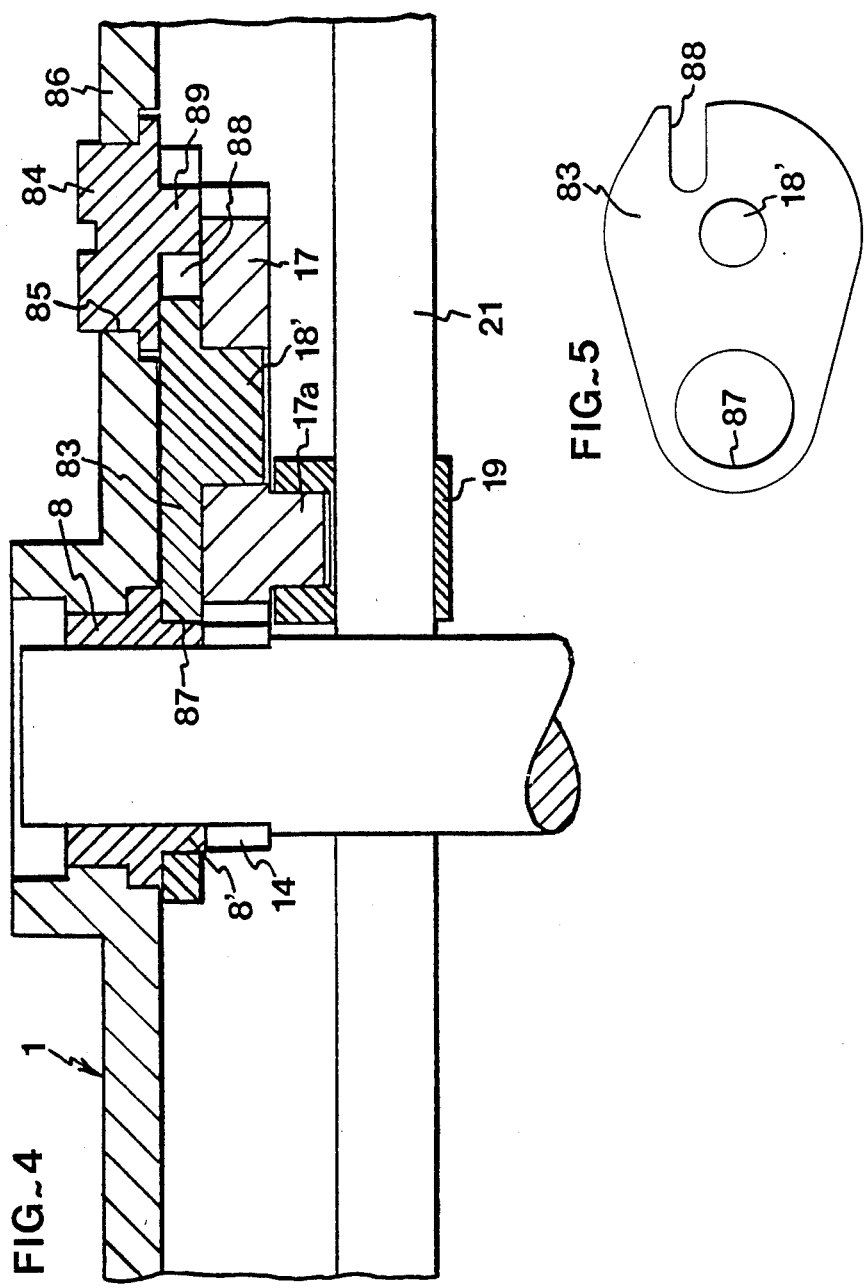

OPEN-FACE FISHING REEL OF THE FIXED-SPOOL TYPE

TECHNICAL FIELD OF THE INVENTION

The present invention relates to an open-face fishing reel of the fixed-spool type.

BACKGROUND OF THE INVENTION

Known fishing reels of this type have a spindle which is rotatably and axially displaceably mounted in a housing and which carries a line spool at one end thereof. The line spool is non-rotatably connected to the spindle and axially fixed thereto. A drive shaft extending at right angles to the spindle is mounted in the housing to be rotated by means of a handle. A driving gear is non-rotatably mounted on the drive shaft and meshes with an oscillating gear mounted in the housing. The oscillating gear has an eccentric pin engaging a driver element axially fixed on the spindle.

When the handle is rotated for retrieving a fishing line fixed to the line spool, the drive shaft and, thus, the driving gear rotate. The driving gear drives the oscillating gear whose eccentric pin moves the driver element back and forth in the longitudinal direction of the spindle. The driver element then oscillates the spindle and, thus, the line spool in the longitudinal direction of the spindle. Through a gear transmission provided in the housing, the handle drives a hollow shaft projecting from the housing and coaxial with the spindle which extends through this shaft. The hollow shaft drives a rotor non-rotatably mounted thereon and carrying a bail for winding the line onto the line spool.

When retrieving the line, this is thus wound onto the line spool which, as opposed to the rotor, does not rotate, but instead executes an axial oscillatory movement. In this manner, the line will be evenly distributed across the line spool. Such an even distribution of the line is however at an optimum only for a particular line diameter. When use is made of a line whose diameter is larger or smaller than this particular line diameter, the winding up of the line will be offset such that the diameter of the mass of fishing line wound onto the line spool does not become the same across the entire axial extent of the line spool, but larger at one or the other end of the line spool. When, after line retrieve, a new cast is made, the line located in the higher region of the wound-up line mass will slide down towards the lower region thereof, thus reducing the possibilities of making long casts.

The object of the present invention therefore is to overcome this problem and provide an open-face fishing reel of the fixed-spool type in which an even line distribution across the line spool can be obtained, independent of the line diameter.

BRIEF DESCRIPTION OF THE INVENTION

According to the present invention, this object is achieved by means of an open-face fishing reel of the fixed-spool type, comprising a housing;
a spindle rotatably and axially displaceably mounted in said housing;
a line spool non-rotatably connected to said spindle and axially fixed to one end thereof;
a drive shaft mounted in said housing and extending at right angles to said spindle;
a handle for rotating said drive shaft;
a driving gear non-rotatably mounted on said drive shaft;
driver means axially fixed on said spindle;
an oscillating gear meshing with said driving gear and having eccentric means engaging said driver means in order, upon rotation of the drive shaft, to move the spindle back and forth in its longitudinal direction and, thus, oscillate said line spool about a center of oscillation; and
shifting means supporting a bearing pin for said oscillating gear and pivotable about the axis of said drive shaft in order to shift said bearing pin and, thus, displace the center of oscillation of the line spool to the desired position in the longitudinal direction of said spindle.

In a preferred embodiment, the fishing reel comprises an adjusting knob rotatably mounted in the wall of said housing and having an eccentric pin engaging in a groove in said shifting means in order, upon rotation of said adjusting knob, to pivot said shifting means to the desired pivotal position and, thus, displace the center of oscillation of the line spool to the desired position in the longitudinal direction of said spindle.

BRIEF DESCRIPTION OF THE ACCOMPANYING DRAWINGS

The invention will now be described in more detail with reference to the accompanying drawings, in which:

FIG. 1 is an exploded view showing the known open-face fixed-spool reel as briefly described by way of introduction.

FIGS. 2A, 2B and 2C illustrate the line distribution problem encountered in the known fishing reel.

FIG. 3 is partial exploded view showing an open-face fixed-spool reel according to the present invention in which only the part of the fishing reel of particular interest to the invention is shown.

FIG. 4 is a sectional view showing a shifting mechanism in the fishing reel according to the present invention, and FIG. 5 is a side view showing a shifting plate included in the shifting mechanism.

DETAILED DESCRIPTION OF THE INVENTION

The known open-face fishing reel of the fixed-spool type shown in FIG. 1 has a housing 1 with a foot 2 for securing the fishing reel on a fishing rod. The housing 1 has a side plate or cover 3 fixed to the housing by screws 4. A handle 5 is rotatably mounted in the cover 3 by means of a support bearing 6 and a bearing washer 7, and in the opposite side wall of the housing 1 by means of a support bearing 8. The shaft 9 of the handle 5 is axially fixed by means of a shoulder 10 on the handle side and a screw 11 with a knob-like head on the opposite side. The screw 11 is screwed in a threaded axial bore in the free end of the shaft 9. The shaft 9 has square cross-section throughout the major part of its length and non rotatably carries a gear unit 12. The gear unit 12 comprises a driving gear 13 with axially directed teeth on its side facing away from the cover 3, and a smaller driving gear 14. Between the two driving gears 13 and 14, the unit 12 has a cylindrical portion (not shown) with an annular circumferential groove for receiving a spring 15. The spring 15 has an axially directed leg 15a cooperating with a pawl 15b pivotally fixed in the housing 1 so as to form a so-called silent anti-reverse which can be engaged and disengaged by means of a mechanism 16.

An oscillating gear 17 is mounted on a bearing pin 18 extending into the housing 1 from the wall thereof opposing the cover 3. The gear 17 meshes with the smaller driving gear 14 and has an axially directed eccentric pin 17a engaging in a vertical groove (not shown) in a driver element 19. The driver element 19 has a through bore 20 through which a spindle 21 extends. The spindle 21 is rotatably and axially displaceably mounted in the housing 1 and non-rotatably carries a line spool 22 on its end projecting from the housing 1. At its other end, the spindle 21 engages a brake mechanism 23, not described in more detail here, which comprises, inter alia, a toothed wheel 23a for cooperating with a click spring 23b fixed on the cover 3.

The spindle 21 has two annular circumferential grooves 24 between which the driver element 19 is mounted by means of a mounting element 25 fixed to the driver element 19 by a screw 26. The mounting element 25 has two legs 27 engaging in the grooves 24 in the spindle 21, such that the driver element 19 is axially fixed on the spindle 21 which is however rotatable relative to the driver element.

The spindle 21 also rotatably extends through a rotor shaft 28 considerably shorter than the spindle. The rotor shaft 28 is rotatably mounted in a support bearing (not shown) in an internal flange 29 in the housing 1 and in a ball bearing 30 in the end wall of the housing 1 opposite the brake mechanism 23. On its inner end, the rotor shaft 28 carries a gear 31 non-rotatably connected thereto and meshing with the larger driving gear 13. The ball bearing 30 is surrounded by two spacer washers 32 and 33 and maintained in place by a locking washer 34 engaging in an inner groove 35 in a sleeve 36 axially projecting from said end wall of the housing 1. The rotor shaft 28 has two diametrically opposed planar surfaces 37 forming a so called flat and non-rotatably carrying a ring 38 between the ball bearing 30 and the spacer washer 33. The ring 38 has a radial stop lug 39 for cooperating with the pawl 15b.

On its outer end, the rotor shaft 28 non-rotatably carries a rotor 40 secured to the rotor shaft by a locking washer 41 and a nut 42. The rotor 40 substantially has the form of a cylinder divided into two cylinder parts 43 and 44 by an inner wall 45. The cylinder part 43 surrounds an annular flange 46 radially projecting from the sleeve 36, and the cylinder part 44, having a smaller outer diameter than the cylinder part 43, is surrounded by a sleeve 47 axially projecting from the line spool 22.

The rotor 40 has two diametrically opposed attachments 48 and 49 integrally formed with the cylinder part 43 and extending axially over the cylinder part 44 at a certain radial distance therefrom. A bail 50 is pivotally fixed at its ends to the attachments 48 and 49 by means of mounting elements 51 and 52. To permit pivotal movement of the bail 50, the mounting elements 51 and 52 are rotatably connected to the attachments 48 and 49 by screws 53 and 54 forming a pivot shaft for the bail at right angles to the spindle 21. The bail 50 is pivotable between an operative folded-in position which is shown in FIG. 1 and in which it extends substantially at right angles to the spindle 21, and an inoperative folded-out position in which it is located on the opposite side of the spindle 21 and makes an angle therewith which is of the order of 45°.

A bearing pin 55 for a line roller 56 is fixed to one end of the bail 50. This end of the bail is connected to the mounting element 51 by a screw 57 extending through an arm 58 on the mounting element 51 and through a spacer sleeve 59 and screwed in the bearing pin 55.

When turning the handle 5 in the direction of line retrieve P, i.e. in the direction in which a fishing line (not shown) fixed to the line spool 22 is wound onto the line spool, the larger driving gear 13 drives the gear 31, such that the rotor 40 and, thus, the bail 50 are rotated. At the same time, the smaller driving gear 14 drives the oscillating gear 17, such that the driver element 19, by the engagement of the eccentric pin 17a in the vertical groove therein, is moved back and forth so as to oscillate the spindle 21 and, thus, the line spool 22 in the longitudinal direction of the spindle. The spindle 21 and the line spool 22 are however not rotated during line retrieve. The fishing line runs over the line roller 56 on the folded-in bail 50 and is wound onto the line spool 22 during the rotation of the bail. Since the line spool 22 is oscillated during the line winding operation, the line is distributed axially across the line spool.

Before a cast is to be made, the bail 50 is pivoted to the folded-out position so as to release the line from the line roller 56. During the cast, the line is paid out from the line spool 22 which, like the rotor 40, remains still during the cast. When line retrieve is again to be effected after the cast, the bail 50 is automatically swung back to the folded-in position, and the line is placed on the line roller 56.

The bail 50 can be seized with one hand for pivoting from the folded in position to the folded-out position. Preferably, the bail 50 is however swung to the folded-out position before a cast by means of a trigger mechanism 60 mounted on the attachment 48 and engaging the mounting element 51.

The trigger mechanism 60 comprises an angle arm 61 one leg of which is rotatably connected to the mounting element 51 by a screw 62 screwed in a sleeve 63 extending through an eccentrically located hole 64 in the mounting element 51. The angle arm 61 has a longitudinal groove 65 in its other leg. The trigger mechanism 60 further comprises a trigger 66 pivotally connected to the attachment 48 by a screw 67 screwed in a hole 68 in one side wall of the attachment 48. On its side facing the attachment 48, the trigger 66 has a projection (not shown) engaging in the groove 65. When the trigger 66, for instance by the index finger, is pivoted a short distance away from the attachment 48 about its pivot shaft formed by the screw 67, the mounting element 51 will be rotated in such a direction that the bail 50 is swung to its folded-out position. The bail 50 is maintained in its folded-out position, as in its folded-in position, by a spring 69 mounted in the attachment 48 underneath a cover 71 fixed thereto by a screw 70. When the trigger 66 is released, it is returned to its initial position by a spring 72, so that its projection moves freely in the groove 65 without returning the mounting element 51.

In order to bring the trigger 66 into a suitable position for index-finger actuation prior to a cast, the handle 5 is turned in the direction opposite to the direction of line retrieve P, the rotor shaft 28 and, thus, the ring 38 non-rotatably mounted thereon being rotated until the stop lug 39 encounters the pawl 15b and further rotation of the handle 5 in the direction opposite to the direction of line retrieve P thus is prevented. In this stop position, the trigger 66 is in a suitable position for index-finger actuation, which is a position substantially diametrically opposed to the position shown in FIG. 1.

The above-mentioned automatic return of the bail 50 to its folded-in position as soon as line retrieve is commenced after a cast, is brought about by means of a return mechanism 73. The mechanism 73 comprises a spring-loaded angle arm 74 provided within the cylinder part 43, and a lever 75 provided in the attachment 49 underneath a cover 77 fixed thereto by a screw 76. The angle arm 74 is rotatably mounted on the wall 45 separating the cylinder parts 43 and 44 from each other, by means of a screw 78 defining an axis of rotation for the angle arm parallel to the spindle 21. One leg of the angle arm 74 extends through a slot (not shown) in the wall of the cylinder part 43 into the attachment 49 while its other leg is located in the cylinder part 43 for cooperating with a cam curve 80, provided with a wear plate 79, on the fixed sleeve 36. The lever 75 is rotatable about a pin 81 parallel to the screw 54 about which the mounting element 52 is rotatable. The mounting element 52 has an eccentrically disposed projection 82 cooperating with one lever arm of the lever 75. The other lever arm of the lever 75 cooperates with the leg of the angle arm 74 extending into the attachment 49. When line retrieve is commenced after a cast, the rotor 40 is rotated, the cam curve 80 acting on the angle arm 74 which in turn acts on the lever 75 in such a direction that, by cooperating with the projection 82, it will pivot the bail 50 to its folded-in position.

The known fishing reel described above suffers from the problem which was mentioned in the introduction to this specification and which will now be described in more detail with reference to FIGS. 2A, 2B and 2C. These Figures show the line spool 22, the line roller 56 of the bail 50 and a fishing line L running over the line roller.

In connection with line retrieve, the bail 50 rotates about the line spool 22 which does not rotate, the line L running over the line roller 56 being wound onto the line spool 22. The line is then evenly distributed across the line spool 22 thanks to the oscillation thereof in the manner described above. Such an even distribution of the line wound on the line spool is shown in FIG. 2A. It is however obtained only for a particular line diameter. When a thinner line is used, a major proportion of the line is wound onto the front part of the line spool 22, as shown in FIG. 2B, and when a thicker line is used, a major proportion of the line is wound onto the rear part of the line spool 22, as shown in FIG. 2C. During a cast, the line in the higher region of the line mass will slide down towards the lower region thereof, with a consequent risk of line tangle and reduced possibilities of making long casts.

An open-face fishing reel of the fixed-spool type according to the present invention will now be described in more detail with reference to the FIGS. 3–5. FIG. 3, corresponding to FIG. 1, shows only that part of the fishing reel which is of particular interest in the present invention. The components of the fishing reel which are not shown in FIG. 3 and which will not be described in more detail with reference to FIGS. 3–5 are similar to the corresponding components of the fishing reel in FIG. 1. The fishing reel according to the present invention shown in FIG. 3 has a shifting mechanism for obviating the above-mentioned problem.

The fishing reel shown in FIG. 3 differs from that shown in FIG. 1 in that the support bearing 8 has a further sleeve portion 8', a shifting plate 83 is pivotally mounted on the sleeve portion 8', and an adjusting knob 84 is rotatably mounted in a through hole 85 in the side wall 86 of the housing 1 opposite to the cover 3. The plate 83 supports the bearing pin 18' of the oscillating gear 17. Thus, the bearing pin 18' is not, as in the fishing reel of FIG. 1, a bearing pin fixedly mounted in the housing 1, but a bearing pin movable with the plate 83.

At one end, the shifting plate 83 has a through hole 87 through which the sleeve portion 8' extends, and at its other end a slot 88 in which an eccentric pin 89 formed on the adjusting knob 84 engages. When rotating the adjusting knob 84, the plate 83 is pivoted by the eccentric pin 89 about the axis of the sleeve portion 8', which axis also is that of the driving gear 14 engaging the oscillating gear 17. During this pivotal movement, the bearing pin 18' and, hence, the oscillating gear 17 with the eccentric pin 17a are thus also pivoted, such that the driver element 19 and, thus, the spindle 21 are moved in the longitudinal direction of the spindle. If use is made of a fishing line (FIG. 2B) which is thinner than the fishing line for which the optimal line distribution shown in FIG. 2A is obtained, the adjusting knob 84 is turned in such a direction that the driver element 19 and the spindle 21 are moved to the left in FIG. 4, whereby the line spool 22 mounted on the spindle 21 is also moved to the left, as indicated by the arrow P1 in FIG. 2B. By turning the adjusting knob 84 in the opposite direction, the line spool 22 is similarly moved to the right (the arrow P2 in FIG. 2C) when a thicker line is used.

Since the center of oscillation of the line spool 22, which is determined by the position of the bearing pin 18', can be shifted in the longitudinal direction of the spindle 21 to be positioned depending on the diameter of the fishing line used, it is possible to obtain an even distribution of the line on the line spool, independent of the diameter of the line.

What I claim and desire to secure by Letters Patent is:

1. Open-face fishing reel of the fixed-spool type, comprising
   a housing;
   a spindle rotatably and axially displaceably mounted in said housing;
   a line spool non-rotatably connected to said spindle and axially fixed to one end thereof;
   a drive shaft mounted in said housing and extending at right angles to said spindle;
   a handle for rotating said drive shaft;
   a driving gear non-rotatably mounted on said drive shaft;
   driver means axially fixed on said spindle;
   an oscillating gear rotatably mounted on a bearing pin and meshing with said driving gear, said oscillating gear having eccentric means thereon for engaging said driver means in order, upon rotation of the drive shaft, to move the spindle back and forth in its longitudinal direction and, thus, oscillate said line spool about a center of oscillation; and
   shifting means for supporting said bearing pin for said oscillating gear, and means for pivoting said shifting means about the axis of said drive shaft in order to shift said bearing pin and, thus, displace the center of oscillation of the line spool to a desired position in the longitudinal direction of said spindle.

2. Reel as claimed in claim 1, said means for pivoting comprising an adjusting knob rotatably mounted in a wall of said housing and having an eccentric pin thereon engaging a slot in said shifting means in order, upon rotation of said adjusting knob, to pivot said shifting means to a desired pivotal position and, thus, displace the center of oscillation of the line spool to the desired position in the longitudinal direction of said spindle.

* * * * *